United States Patent [19]

Hölter et al.

[11] 4,222,993

[45] Sep. 16, 1980

[54] REMOVAL OF NOXIOUS CONTAMINANTS FROM GAS

[75] Inventors: Heinz Hölter, Gladbeck; Heinz Gresch, Dortmund-Derne; Heinrich Igelbüscher, Gladbeck, all of Fed. Rep. of Germany

[73] Assignee: Heinz Hölter, Gladbeck, Fed. Rep. of Germany

[21] Appl. No.: 855,268

[22] Filed: Nov. 28, 1977

Related U.S. Application Data

[63] Continuation-in-part of Ser. No. 606,785, Aug. 22, 1975, Pat. No. 4,080,428.

[30] Foreign Application Priority Data

Dec. 3, 1976 [DE] Fed. Rep. of Germany ....... 2654843
Feb. 24, 1977 [DE] Fed. Rep. of Germany ....... 2707935
Jul. 8, 1977 [DE] Fed. Rep. of Germany ....... 2730845
Oct. 19, 1977 [DE] Fed. Rep. of Germany ....... 2746926

[51] Int. Cl.² ............................................. C01B 17/00
[52] U.S. Cl. .................................. 423/243; 423/242; 423/166

[58] Field of Search ............... 423/242, 243, 244, 766, 423/555

[56] References Cited

U.S. PATENT DOCUMENTS

| | | | |
|---|---|---|---|
| 2,632,306 | 3/1953 | Villiers-Fisher et al. | 423/242 |
| 2,729,543 | 1/1956 | Keller | 423/243 |
| 3,757,488 | 9/1973 | Austin et al. | 423/243 X |
| 3,928,537 | 12/1975 | Smith et al. | 423/243 |
| 3,959,441 | 5/1976 | Furuta et al. | 423/166 X |

*Primary Examiner*—O. R. Vertiz
*Assistant Examiner*—Gregory A. Heller
*Attorney, Agent, or Firm*—Berman, Aisenberg & Platt

[57] ABSTRACT

Gas contaminated with at least one noxious component, such as $SO_2$, HF or $NO_x$, is scrubbed with a clear, calcium-containing, initially-basic washing liquid which also comprises the anion of a strong inorganic acid, that of a polybasic carboxylic acid and, optionally, that of a monobasic carboxylic acid. Apparatus is provided for scrubbing the gas, oxidizing produced calcium bisulfite to calcium sulfate, separating out and removing solids, and recirculating clarified liquid for scrubbing contaminated gas.

23 Claims, 1 Drawing Figure

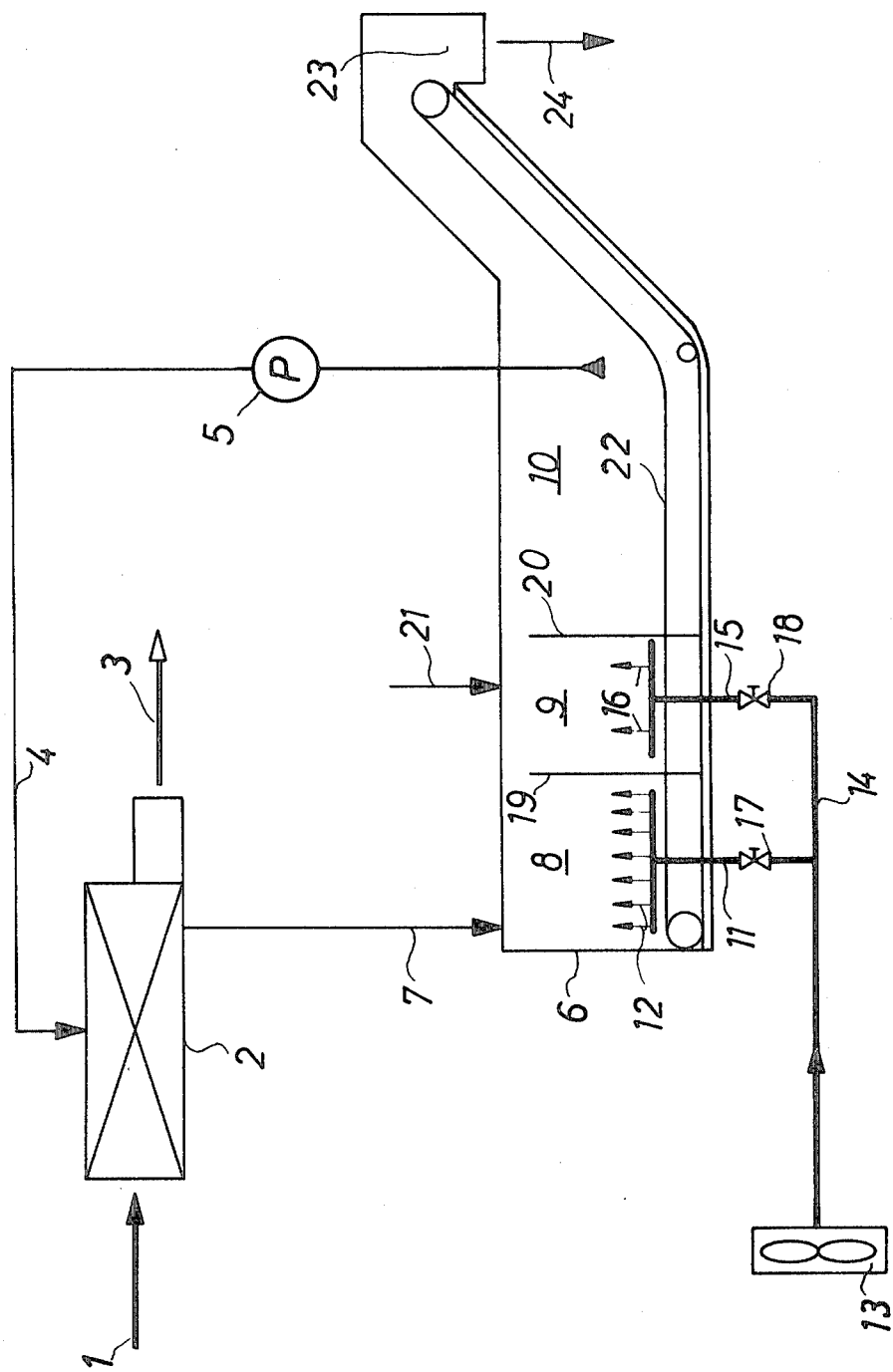

REMOVAL OF NOXIOUS CONTAMINANTS FROM GAS

Related Application

This application is a continuation-in-part (cip) of application Ser. No. 606,785, now U.S. Pat. No. 4,080,428, filed on Aug. 22, 1975, which corresponds to German Application DT-OS 25 32 373, published on Jan. 20, 1977. The entire disclosure (including drawings) of parent application Ser. No. 606,785 is incorporated by reference in and is thus made a part of the present application.

BACKGROUND

When, e.g., according to the process of parent application Ser. No. 606,785(a) $SO_2$-containing waste gas is scrubbed with circulating calcium-ion-containing clear wash liquid having a maximum initial pH of 12 and a minimum subsequent pH in the weakly-acid zone, (b) acid or salt ingredient means are then added to the gas-contacted wash liquid to increase the degree of calcium-ion dissociation therein, (c) calcium bisulfite in the ingredient-means-containing wash liquid is subsequently oxidized to calcium sulfate at a pH of at least 4.5, (d) one or more calcium-ion-providing compounds, e.g. calcium carbonate, calcium oxide and calcium hydroxide, are thereafter added to the wash water and (e) the resulting calcium-ion-containing wash liquid is clarified before scrubbing $SO_2$-containing gas therewith, comparatively large quantities of wash liquid and correspondingly large equipment are required to effect any particular degree of $SO_2$ removal from the $SO_2$-contaminated gas being scrubbed.

The so-called "water factor" is the volume of water (in liters) which is required in the scrubber (washer) to remove 90% (by volume) of the $SO_2$ from 1 $Nm^3$ (one cubic meter at atmospheric pressure and 20 degrees centigrade) of gas, e.g. waste gas or flue gas, containing 2.5 grams (g) per $Nm^3$ of $SO_2$. Even when the means to increase the calcium-ion-dissociation includes both strong inorganic, e.g. hydrochloric, acid or salt thereof and monobasic organic acid, such as formic acid, or a salt thereof, the water factor is 2.8 liters per $Nm^3$ of moist flue gas. Ever-increasing requirements for purifying gases, particularly for removing harmful or noxious substances from flue gas, render extraordinarily significant any material reduction in the water factor and concomitant reduction in operation and equipment costs.

SUMMARY OF THE INVENTION

When the ingredient means to increase the degree of calcium-ion dissociation in contaminated-gas-contacted wash liquid (circulated in the scrubbing process of parent application Ser. No. 606,785) contains dibasic carboxylic, e.g. tartaric, or other polybasic carboxylic, e.g. citric, acid or a salt of either in addition to or in lieu of monobasic carboxylic, e.g. formic, acid or a salt thereof, the noxious-contaminant, e.g. $SO_2$, absorption rate and wash-liquid capacity are significantly increased over those obtainable without such a multibasic carboxylic acid or salt thereof.

An object of this invention is to improve the effectiveness of wash liquid in scrubbing noxious components, e.g. $SO_2$, HF, $NO_x$ (NO, $NO_2$, $N_2O_5$, etc.) from gas contaminated thereby. A further object is to increase the capacity and/or efficiency of existing apparatus for scrubbing such contaminated gas with circulating wash liquid or to reduce the size of apparatus required to achieve the same degree and/or rate of purification of such contaminated gas. Additional objects are apparent from the following description, which includes apparatus for implementing process aspects of this invention.

BRIEF DESCRIPTION OF THE DRAWING

The sole FIGURE is a schematic diagram illustrating an arrangement of apparatus suitable for conducting the process aspects of this invention.

DETAILS

Noxious, generally acidic, components, such as $SO_2$, HF and $NO_x$ (NO, $NO_2$, $N_2O_5$, etc.) often contaminate gas designated, e.g., as crude gas, waste gas, exhaust gas or byproduct gas. The utility of such gas is often materially increased by removing such noxious contaminants, particularly $SO_2$. A relatively-simple way has now been found for increasing the efficiency of such noxious-component removal and of the efficiency of such noxious-component removal and of the capacity of existing equipment to effect such removal.

In a process which comprises:

(I) Scrubbing or washing contaminated gas by contacting it with recycling clarified aqueous wash liquid, containing (a) strong inorganic, e.g. hydrochloric, acid or a salt thereof to increase the degree of calcium-compound dissociation and, optionally, (b) monocarboxylic organic, e.g. formic, acid or a salt thereof;

(II) oxidizing calcium-sulfur compounds, e.g. calcium bisulfite, in the resulting wash liquid into calcium sulfate;

(III) increasing the calcium-ion concentration of the wash liquid by dissolving therein one or more calcium compounds such as calcium carbonate, calcium oxide or calcium hydroxide, to bind, e.g., sulfur dioxide during the scrubbing or washing;

(IV) separating precipitated calcium sulfate from and clarifying the wash liquid; and (V) scrubbing or washing further and similarly-contaminated gas by contacting it with thus-clarified wash liquid; the absorption capacity of the wash liquid for holding and its efficiency for removing the noxious contaminants are materially increased by incorporating multi-basic carboxylic acid in the recycling wash liquid.

To increase the intensity of the washing process in connection with, e.g., flue-gas washing, a strong inorganic acid, especially hydrochloric acid, is added to the wash liquid to increase the degree of calcium dissociation. This results in a considerably-increased number of dissolved calcium ions, which combine with and thus bind sulfur dioxide from the flue gas considerably faster and more intensively than is possible with, e.g., suspended lime or other calcium-compound particles. During the binding of sulfur dioxide to dissolved calcium ions, the added strong acid is released to dissolve any lime or other calcium-compound particles, which may still be in suspension or developing incrustation. The strong inorganic acid both increases the efficiency of the system and prevents incrustation development.

Notwithstanding the foregoing, continued difficulty is, unfortunately, encountered with incrustation. By virtue of the surplus supply of lime or other calcium-containing compound present in the wash liquid, the amount of lime or other calcium-containing compound in the wash liquid that is dissolved and the amount of developing strong acid that is available (depending on the amount of sulfur dioxide in the flue gas) for incrustation dissolution are stoichiometrically indeterminable. The resulting tendency to add a relatively large excess of strong acid to the wash liquid must be resisted because such addition also constitutes a stress on system components. The apparent dilemma is resolved by adding a mixture of strong inorganic acid and weak organic acid, especially formic acid, to the wash liquid. By virtue of the formic or other weak organic acid, the effect of the strong inorganic, e.g. hydrochloric, acid is buffered. Sulfur dioxide from the flue gas first releases and then combines with calcium ions from the produced calcium salt of the weak organic acid, e.g. calcium formate, thus slowly reducing the pH of the wash liquid so that sulfur dioxide wash-out takes place with good efficiency and with intensive calcium-containing compound utilization. Only when calcium ions of the salt of the weak organic acid have been used up are calcium ions of the salt of the strong inorganic acid released, resulting in a faster decrease in pH to that value required for reliable dissolution of incrustation.

In general, the pH-value of the wash liquid is adjusted prior to contact with flue or other contaminated gas to a value which is not in excess of 12 or below 6.8. At a pH in excess of 12 the desired sulfur dioxide wash-out, incrustation prevention and calcium bisulfite formation are adversely affected. The pH value of 12 therefore represents an upper limit for effective wash liquid. Care must also be taken that the pH value of the wash liquid, upon contact with the flue gas, will reach the weak-acid range but will not drop below a pH of 3, advantageously not below a pH of 4, and preferably not below a pH of 4.5. In the basic to slightly-acid range, extraction of sulfur dioxide from flue gas takes place with particular intensity. Moreover, calcium bisulfite, rather than calcium sulfite, is preferentially formed in the weak-acid range. Calcium bisulfite is readily oxidized to calcium sulfate, a product which is very difficult to produce by oxidizing calcium sulfite. Calcium sulfate is practically insoluble in water and is readily precipitated and separated therefrom without any precautions.

Even with a monobasic carboxylic acid, such as formic acid, in the wash liquid, the water factor obtained by following this procedure for scrubbing contaminated gas is at 2.8 liters per standard cubic meter of moist flue gas. Surprisingly, the water factor is significantly reduced when a multibasic carboxylic acid is used in place of or in addition to the noted weak organic (monobasic) acid.

Although dibasic carboxylic acids, such as tartaric acid, maleic acid, malic acid, malonic acid and succinic acid, are suitable for this purpose, a tribasic carboxylic acid, especially citric acid, is preferred. With such polybasic carboxylic acids in the wash liquid, the sulfurdioxide absorption rate is considerably higher and the absorption capacity of the wash liquid is greater than when a monobasic carboxylic acid, such as formic acid, is the sole carboxylic acid in the wash liquid. When clarified wash liquid contains a polybasic carboxylic acid, a specified volume of gas is relieved of its noxious impurities with a considerably smaller volume of wash liquid and without reducing or impairing the degree of noxious-component removal.

The presence of polybasic carboxylic acid in clarified wash liquid used to scrub, e.g., flue gas makes it possible to work with a considerably-lower wash-liquid factor (liters of wash liquid per cubic meter of flue gas). Accordingly, less liquid has to be pumped into the system, thus reducing the amount of work required by and/or the size of the pump and other components of the system. Wash-liquid containers, oxidation vessels and clarification units are commensurately scaled down in size.

As noxious acidic contaminants are absorbed by the wash liquid from contaminated gas during scrubbing, the pH of the wash liquid lowers at least to a pH of 6.6. This lowering pH does not result in any precipitation; there is no formation of calcium sulfite and/or of calcium carbonate. In the pH range from 6 to 6.8 calcium bisulfite is fairly readily oxidized to calcium sulfate.

Tribasic carboxylic acid, such as citric acid, acts as a buffer both in the alkaline and in the acid range. The strong buffer action of polybasic carboxylic acid in the wash liquid in the pH range of, e.g., 4 to 7 also assures extensive corrosion protection for system components.

Another advantage of wash liquid containing polybasic carboxylic acid is that considerably-larger crystals of calcium sulfate (gypsum) are formed during oxidation than are formed when other wash liquids are used for scrubbing. This assures considerably-better reduction of the water content in the calcium sulfate residue, which must be filtered off, e.g., by means of drum vacuum filters or centrifuges.

When, e.g., citric acid is the sole organic acid in the wash liquid and the pH of the wash liquid is permitted to exceed 10, comparatively large quantities of added citric acid are decomposed; when the pH of the wash liquid is permitted to reach a value of less than 4, comparatively large quantities of citric acid are precipitated. Thus decomposed or precipitated citric acid must be replaced. The involved expense is to be avoided. This limitation of the process is readily overcome by including in the wash liquid both a monobasic carboxylic acid, such as formic acid, and a multibasic carboxylic acid, such as citric acid.

By including both monobasic and polybasic carboxylic acids in the wash liquid, decomposition of the multibasic carboxylic acid is precluded in the pH range above 10 and below 4. As an added bonus, a further increase in the sulfur-dioxide absorption rate is surprisingly attained, thus leading to a further reduction in the wash-water factor. When a strong inorganic acid, such as hydrochloric acid, is the sole acid in the wash liquid or is in admixture with a monobasic carboxylic acid, such as formic acid, the wash-water factor is in the range of about 2.8. The combination of such strong inorganic acid with a polybasic acid, such as citric acid, in the wash liquid yields a wash-water factor in the range of about 1.96. The combination of a strong inorganic acid with both a monobasic carboxylic acid and a polybasic carboxylic acid in the wash liquid reduces the wash-water factor to about 1.4. This means that only 1.4 liters of wash liquid are required per standard cubic meter of moist flue gas. In the latter case the produced crystalline calcium sulfate (gypsum) is readily suitable for further processing, no corrosion of system components is observed and loss of added acid is minor.

When both a monobasic carboxylic acid and a multibasic carboxylic acid are employed in the wash liquid, the preferred ratio between the two depends on the sulfur-dioxide content of the contaminated gas and the volume of wash liquid employed. At a sulfur-dioxide content of 2.5 grams per standard cubic meter of, e.g., crude gas a convenient ratio of monobasic carboxylic acid to multibasic carboxylic acid is about 3:1. A particularly advantageous volume ratio is about 10:1. The useful range of such volume ratio extends to 100:1.

Carboxylic acid is continuously added to circulating wash liquid to replenish that which is constantly removed from the cycle along with moist calcium sulfate or along with removed water. Strong inorganic acid, such as hydrochloric acid, is added to circulating wash liquid only when needed. Such addition is not required when contaminated gas (being scrubbed) contains an adequate concentration of chlorine ions. Under such circumstances the chlorine-ion concentration need not be implemented. When the contaminated gas contains such a high concentration of, e.g., chlorine ions that the concentration desired in the wash liquid is actually exceeded, a corresponding volume of wash liquid is removed from the wash-liquid cycle to reduce the chlorine-ion concentration.

Although previously referred to primarily in terms of acid additives to the wash liquid, at least the monobasic carboxylic acid is best incorporated in the wash liquid in the form of a water-soluble alkaline (alkali-metal, such as sodium or potassium; alkaline earth metal, such as calcium or magnesium; or ammonium) salt. Correspondingly, polybasic carboxylic acid is optionally introduced into the wash liquid in the form of, e.g., an alkaline citrate. Under such circumstances it is also advantageous to incorporate the strong inorganic acid, such as hydrochloric acid, in the wash liquid in the form of an alkaline chloride salt having a common cation with the alkaline salt of the polycarboxylic acid.

The concentration of polycarboxylic acid, e.g. citric acid or alkaline salt thereof, e.g. sodium citrate, in the wash liquid depends on the concentration of noxious components in the contaminated gas being scrubbed. Also, the concentration of an alkali-metal salt can be much higher than that of a corresponding alkaline-earth-metal salt. When an alkali-metal salt is used, a concentration by weight of 5 percent or even more of, e.g., sodium citrate in the wash liquid is suitable.

The capacity of wash liquid to absorb sulfur dioxide when the wash liquid contains the anion of a polybasic carboxylic acid is greater by at least one order of magnitude than that wherein the only anion of a carboxylic acid with which the wash liquid is enriched is that of a monobasic carboxylic acid, such as formic acid. For a flue gas from a coal-fired power plant and with a sulfur-dioxide content of 2,000 milligrams, e.g., about 20 times more sulfur-dioxide ions are absorbed by wash liquid containing the anion of a polycarboxylic acid than with a comparable wash liquid wherein the sole anion of a carboxylic acid is that of a monobasic carboxylic acid. The presence in the wash liquid of a polybasic carboxylic acid or a salt thereof results in a lower wash-liquid factor with correspondingly lower requirements for wash liquid, pump output and size of system components.

In addition to previously-noted enlargement of developing-gypsum crystals and the resultant possible improvement during drainage of calcium sulfate residue, a further advantage of the subject process is that iron is kept in solution in the form of a complex, thus precluding dehydration-inhibiting iron-hydroxide formation, which would impede expulsion of water from the calcium-sulfate residue. In the event of any iron-hydroxide formation, such iron hydroxide is advantageously precipitated at intervals (through higher alkaline adjustment of the washing liquid to pH values of more than 8) and withdrawn from the cycle.

The use of an alkaline chloride (in place of hydrochloric acid) together with an alkaline citrate (in place of citric acid) and, possibly, an alkaline formate (in place of formic acid), in case of $SO_4$-ion exchange, via $Ca(OH)_3$, leads to more-quantitative precipitation of calcium sulfate (gypsum).

Quantitative values are provided by the following table, which reflects results of three experiments with wash liquids of differing compositions. The additives, i.e. hydrochloric acid, formic acid and citric acid, were added to the wash liquid in each case in the form of an aqueous solution of the corresponding calcium salt.

TABLE OF EXAMPLES

|  | Experiment | | |
| --- | --- | --- | --- |
|  | 1 | 2 | 3 |
| Gas (moist) Volume ($Nm^3/h$) | 100,000 | 100,000 | 100,000 |
| Water Circulation Volume ($m^3/h$) | 280 | 196 | 140 |
| Additives: | | | |
| Hydrochloric Acid (mg/l) | 3,500 | 3,500 | 3,500 |
| Formic Acid (mg/l) | 1,500 | — | 800 |
| Citric Acid (mg/l) | — | 700 | 80 |
| Water Factor ($l/Nm^3$ - moist) | 2.8 | 1.96 | 1.4 |
| Desulfurization Degree (%) | 90 | 90 | 90 |
| pH Value of Washing Liquid | | | |
| - upon entry into gas washer | 10.8 | 10.8 | 10.8 |
| - upon exit from gas washer | 4 | 6.5 | 4 |

The pH value of the wash liquid, upon entry into the gas washer, is, optionally, varied within a broad range between pH 6.8 and pH 12 for the purpose of attaining the desired degree of desulfurization and/or adapting to the sulfur dioxide content of the crude gas. Similar results are attained by altering the amount of added calcium hydroxide, calcium oxide, calcium carbonate, or other calcium-containing compound without essentially changing the pH value of the wash liquid upon departure from the gas washer.

The preceding table clearly confirms that substituting a tribasic carboxylic acid, such as citric acid, for a monobasic carboxylic acid, such as formic acid, results in a considerable reduction in the water factor, i.e., from 2.8 down to 1.96. The pH of the wash liquid upon exit from the gas washer is naturally higher when citric acid is the sole organic acid than when formic acid is employed.

The combination of a monobasic carboxylic acid, such as formic acid, with a multibasic carboxylic acid, such as citric acid, as additives to the wash liquid, lowers the water factor from 2.8 to 1.4, thus cutting it in half. In practical operation, this means that gas-purification operating costs are effectively cut in half. When the pH of the wash liquid coming out of the gas washer is 4, the formed gypsum is separated with particular ease and has especially-good utilization properties.

The clear or clarified wash liquid when entering the washer has a pH of 10 or more and contains, e.g., between 0.5 and 1.5 grams per liter of calcium hydroxide and the calcium salts of hydrochloric, citric and, optionally, formic acid. These salts are present in quantities which correspond to the following quantities of acids:

| | |
| --- | --- |
| hydrochloric acid | 0.2 to 150, preferably 3.5 grams per liter, |
| citric acid | 0.005 to 0.8 grams per liter, |

| -continued | |
|---|---|
| formic acid | 0.4 to 5, preferably to 0.9 grams per liter. |

If, however, alkali-metal salt is added, the clear or clarified wash liquid entering the washer has a pH of 10 or more and contains between 0.5 and 1.5 grams per liter of, e.g., sodium hydroxide and the alkali-metal salts of hydrochloric, citric and, optionally, formic acid. These salts are present in quantities which correspond to the following quantities of acids:

| hydrochloric acid | 0.2 to 150, preferably to 7 grams per liter, |
|---|---|
| citric acid | 0.2 to 50, preferably to 25 grams per liter, |
| formic acid | 0 to 50, preferably 5 grams per liter. |

The invention also includes apparatus for implementing the method with a known gas washer and a known oxidizer. Oxidation of used wash liquid is simple with a mechanism characterized by an oxidizer consisting of a vessel with several interconnected chambers and wherein at least one chamber is designed as an oxidation chamber with an air inlet, another chamber is designed as a reaction chamber with a calcium-containing compound, e.g. lime or lime milk, supply, and a third chamber serves as a settling chamber. The reaction chamber optionally has an air inlet.

To remove precipitated components, a drag belt is provided at least at the bottom of the settling chamber. This drag belt, however, optionally extends throughout all of the vessel's chambers.

Both process and apparatus aspects of the invention are illustrated in the drawing; the sole FIGURE provides a diagram of a mechanism for purifying crude or other gas containing sulfur dioxide as a contaminant.

Crude gas (which contains $SO_2$ and, possibly, additional harmful substances, such as HF and $NO_x$) is supplied, in the direction of arrow 1, to a conventional gas scrubber or washer 2, from which it is discharged in the direction of arrow 3. Wash liquid (having the composition of that of Experiment 3, in the Table) is supplied to the gas washer 2 via pipeline 4. The wash liquid is moved by pump 5 from tank or vessel 6 into pipeline 4 and the gas washer 2, from which it is again returned to tank 6 via pipeline 7.

Tank 6 is designed as an oxidizer for the wash liquid and/or components therein. It has several series-connected chambers, that is, an oxidation chamber 8, a reaction chamber 9, and a settling basin 10. Air pipeline 11, supplied at one end by fan 13 via collecting line 14, has several outlet openings 12 arranged at its other end in oxidation chamber 8. Adjoining the collecting line 14 is a branch line 15 which ends in reaction chamber 9, in which it has several discharge openings 16. Air pipeline 11 and branch line 15 are equipped with respective adjusting valves 17 and 18 for selectively adjusting the air volume introduced into each such chamber.

Reaction chamber 9 is provided with conventional charging means 21 for introducing calcium-containing material, such as lime, into the reaction chamber. The three chambers, 8, 9, and 10, are separated from each other by walls 19 and 20. In the area adjacent the bottom, walls 19 and 20 have recesses (not illustrated) through which a scraper conveyor 22 extends. In chambers 8 and 9 and in a portion of chamber 10 the scraper conveyor is conducted directly over the tank bottom, which is therein horizontally disposed. In the settling chamber 10 the scraper conveyor rises to a discharge opening 23, from which precipitated calcium sulfate, picked up by the scraper conveyor, is moved out in the direction of arrow 24.

In detail, the illustrated mechanism works as follows: wash liquid, flowing out of the gas washer 2, is first collected in oxidation chamber 8, in which the calcium-sulfur compounds, formed during or subsequent to scrubbing, are oxidized (with air oxygen) into calcium sulfate. Then the wash liquid flows into reaction chamber 9 where, e.g., fresh lime is added. In the downstream-connected settling chamber the formed calcium sulfate sinks to the scraper conveyor 22 so that the pump 5 sucks in substantially clear wash liquid from tank 6.

Washing or scrubbing the $SO_2$-contaminated gas with clarified wash liquid from settling chamber 10 produces calcium bisulfite in the gas-scrubbed wash liquid transmitted to vessel 6. This calcium bisulfite is readily oxidized to calcium sulfate.

The calcium sulfate, discharged at 23, is then conventionally dehydrated in a centrifuge or in a drum vacuum filter to a moisture content of less than 10%. Further drying of the calcium sulfate residue is then optionally effected in a spray dryer, which requires comparatively-little heating energy. The heat energy needed for the spray dryer, at any rate, is minimal, i.e. compared to the heat energy needed to dry calcium-sulfate residue from sulfur-dioxide washers operated with lime sludge, such residue having been obtained according to previously-known methods.

The invention and its advantages are readily understood from the foregoing description. Various changes may be made in the composition of the wash liquid, in the process and in the arrangement and construction of the apparatus without departing from the spirit and scope of the invention or sacrificing its material advantages. The compositions, processes and apparatus hereinbefore described are merely illustrative of preferred embodiments.

What is claimed is:

1. In a process for removing sulfur dioxide from gas contaminated therewith and comprising:
   (a) contacting the gas with circulating calcium-ion-containing wash liquid having a pH from a maximum initial pH of 12 to a minimum subsequent pH of 3;
   (b) adding to the gas-contacted circulating wash liquid acid or salt ingredient means to increase the degree of calcium-ion dissociation therein,
   (c) oxidizing the ingredient-means-containing circulating wash liquid to produce calcium sulfate;
   (d) adding to the circulating wash liquid a sufficient amount of a substance selected from the group consisting of calcium carbonate, calcium oxide and calcium hydroxide to form calcium-sulfur compounds from components in the circulating wash liquid and to provide said circulating wash liquid with calcium ions for step (a), and
   (e) clarifying the circulating wash liquid before contacting the sulfur-dioxide-containing waste gas therewith; the improvement wherein the wash liquid of step (a) contains, in combination, anions of a strong inorganic acid and anions of a polybasic carboxylic acid.

2. A process according to claim 1 wherein the strong inorganic acid is hydrochloric acid.

3. A process according to claim 2 wherein the polybasic carboxylic acid is citric acid.

4. A process according to claim 1 wherein the wash liquid of step (a) additionally contains anions of a monobasic carboxylic acid.

5. A process according to claim 4 wherein the monobasic carboxylic acid is formic acid.

6. A process according to claim 4 wherein the wash liquid of step (a) has a pH within the range of from pH 6.8 to pH 12 and the volume ratio of monobasic carboxylic acid anions to polybasic carboxylic acid anions is in the range of from 3:1 to 100:1.

7. A process according to claim 4 wherein the anions of a monobasic carboxylic acid are those derived from an alkaline salt selected from the group consisting of alkali-metal formate, alkaline-earth-metal formate and ammonium formate, and the anions of a polybasic carboxylic acid are those derived from an alkaline salt selected from the group consisting of alkali-metal citrate, alkaline-earth-metal citrate and ammonium citrate.

8. A process according to claim 1 wherein the wash liquid, prior to contacting the contaminted gas, has a pH of at least 6.8 and at most 12 and, after contacting the contaminated gas, has a pH of at least 4.5 and at most 6.8.

9. A process according to claim 1 wherein the wash liquid, prior to contacting the contaminated gas, has a pH of at least 6.8 and at most 12 and, after contacting the contaminated gas, has a pH of at least 3 and at most 6.

10. A process according to claim 8 wherein the wash liquid has dissolved therein alkali salt of a polybasic carboxylic acid.

11. A process according to claim 10 wherein the alkali salt is that of a member selected from the group consisting of sodium, potassium and ammonium.

12. A process according to claim 10 wherein the wash liquid has dissolved therein an alkaline citrate.

13. A process according to claim 10 wherein the wash liquid has dissolved therein an alkaline chloride salt having the same alkaline ion as that of the polybasic carboxylic acid.

14. A process according to claim 3 wherein the wash liquid has an alkaline citrate concentration of up to 5 percent.

15. In a process for removing sulfur dioxide from gas contaminated therewith by washing the contaminated gas with calcium-ion- and strong-inorganic-acid-anion-containing wash liquid, and subsequently separating a calcium-sulfur compound the improvement wherein the wash liquid comprises a water factor-reducing amount of polybasic-carboxylic-acid anions.

16. A process according to claim 15 wherein the wash liquid has a pH in the range of from pH 4 to pH 12.

17. A process according to claim 15 wherein the polybasic carboxylic acid is tribasic carboxylic acid.

18. A process according to claim 17 wherein the tribasic carboxylic acid is citric acid.

19. A process according to claim 17 wherein the wash liquid contains monobasic carboxylic acid.

20. A process according to claim 19 wherein the monobasic carboxylic acid is formic acid and the polybasic carboxylic acid is citric acid.

21. A process according to claim 19 wherein the volume ratio of monobasic carboxylic acid to polybasic carboxylic acid is about 3:1.

22. A process according to claim 19 wherein the volume ratio of monobasic carboxylic acid to polybasic carboxylic acid is about 10:1.

23. A process according to claim 19 wherein the volume ratio of monobasic carboxylic acid to polybasic carboxylic acid is within the range of from 10:1 to 100:1.

* * * * *